Patented Sept. 29, 1931

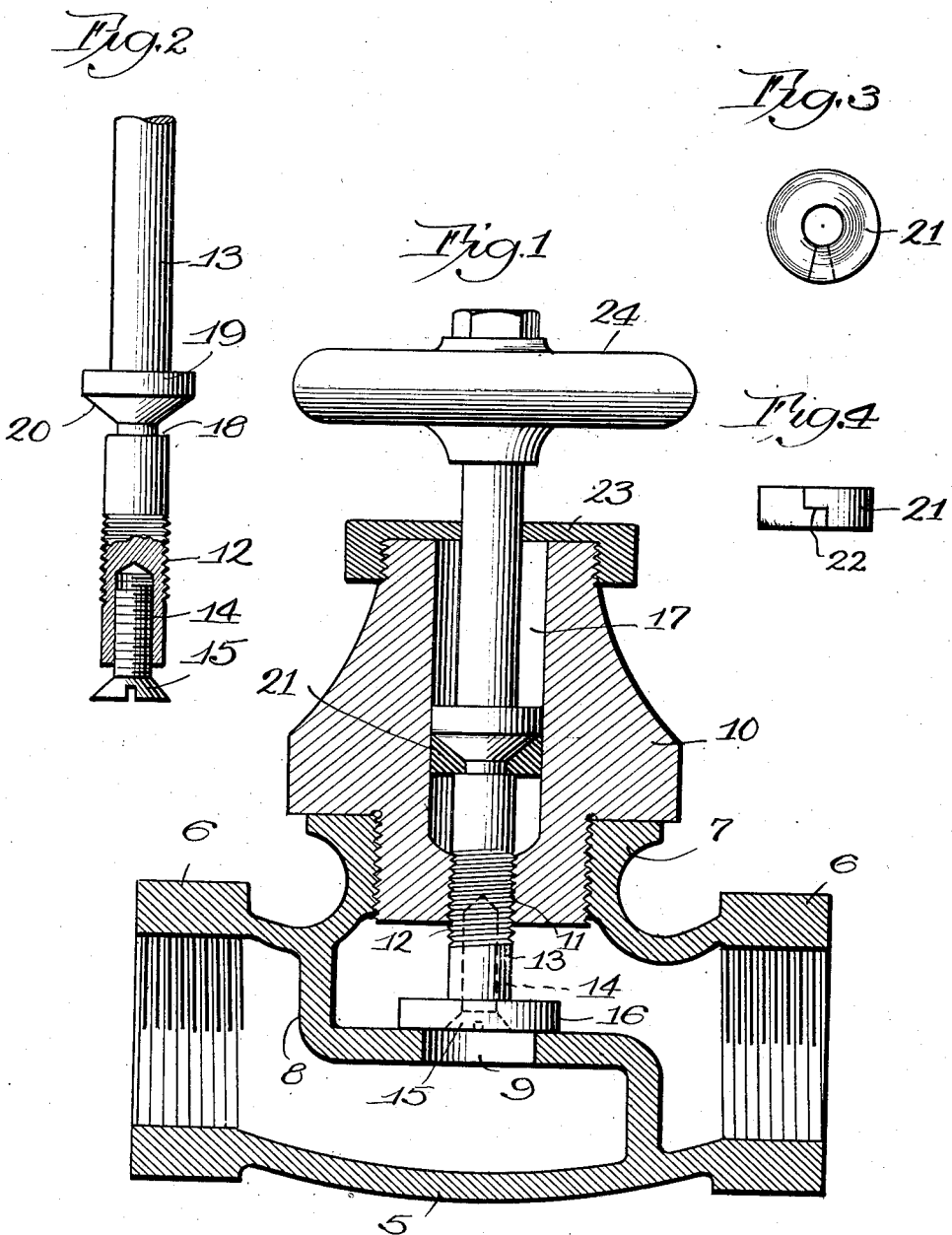

1,825,028

UNITED STATES PATENT OFFICE

ERVIN A. TOWNILL, OF LOCKPORT, ILLINOIS

VALVE

Application filed July 2, 1930. Serial No. 465,353.

My present invention relates to improvements in valves and has for its object the provision of a valve, valve stem, and mounting and packing for the stem which may be easily assembled with commercial forms of globe valves and spigots or faucets.

My construction has for its principal object the packing of the valve stem in a simple and dependable manner which is almost indestructible. I also have as an object the provision of a valve for association with globe valves and spigots of such a simple construction that it can be manufactured and distributed at a reasonable price.

I attain the above mentioned object my means of the structure illustrated in the accompanying drawings, in which—

Fig. 1 is a central, longitudinal section of a globe valve with my invention associated therewith, Fig. 2 is a fragmental view of the valve stem disassociated from its mounting and without the packing ring, Fig. 3 is a plan of the packing ring, and Fig. 4 is a side elevation of the packing ring shown in Fig. 3.

Similar reference characters refer to similar parts throughout the respective views.

The usual form of globe valve, as shown in Fig. 1, comprises the body 5 at either end of which are interiorly threaded hubs 6. Arising from one side, preferably the top of the valve body 5, is a hollow tubular interiorly threaded embossment 7. Extending from the wall of the valve body having the embossment 7 to the opposite wall is the angled partition 8 which is perforated immediately opposite and centrally of the hollow embossment 7 to provide the valve port 9. Screwing into the hollow-embossment 7 is the valve stem casing 10 which is centrally bored and tapped at 11 to receive the threaded portion 12 of the valve stem 13. The lower end of the valve stem is bored and tapped, at 14, to receive the machine screw 15 for holding the valve 16 on the end of the valve stem. The bore in the valve stem casing above the tapped portion at 11 is enlarged, as at 17, and the valve stem about centrally of the enlarged portion 17 is cut in to form an annular recess, as at 18, and formed integrally or otherwise secured to the valve stem is an enlargement 19, the side of which facing the cut in portion 18 is tapered, as at 20. Fitting into the cut in portion 18 and the taper 20 of the valve stem is the split packing ring 21. I prefer to split the packing ring 21 radially with a central shoulder 22, as shown most plainly in Fig. 4.

The slight spring of the split packing ring 21, together with the taper 20, insures a particularly practical sealing and packing of the valve stem when the valve is closed, and at all other times. The enlarged bore 17 of the valve stem casing 10 is closed at the top by the centrally perforated cap 23 through the central perforation in which extends the upper portion of the valve stem to which is secured in any desired way a hand wheel 24 or other handle.

Having described my invention what I claim as new and desire to secure by Letters Patent is:

1. In combination with a valve body having a centrally disposed partition with a valve port therein and a tubular embossment opposite said port, a valve stem casing closing said tubular embossment, said valve stem casing being centrally bored and tapped, a threaded valve stem associated with said tapped bore and a valve carried thereby co-operating with said port, the central bore in said valve stem casing having an enlarged portion, said valve stem being recessed and a split ring sprung into said recess and co-operating with the enlarged bore in said valve stem casing.

2. A valve, a valve stem, means for detachably securing said valve to said valve stem, a valve stem casing centrally bored, a portion of said bore being tapped and the remainder thereof being enlarged, said valve stem being threaded at a point for co-operating with the tapped portion of said valve stem casing, said valve stem having an annular recess and a split ring sprung into the recess in said valve stem and co-operating with the walls of the enlarged bore in said valve stem casing.

3. A valve, a valve stem, means for detachably securing said valve to said valve stem, a valve stem casing centrally bored, a portion of said bore being tapped and the remainder thereof being enlarged, said valve stem being threaded at a point for co-operating with the tapped portion of said valve stem casing, said valve stem having an annular recess with an oblique wall and a split ring having an oblique wall sprung into the recess in said valve stem and co-operating with the walls of the enlarged bore in said valve stem casing.

ERVIN A. TOWNILL.